United States Patent [19]

Ainai

[11] Patent Number: 5,663,800
[45] Date of Patent: Sep. 2, 1997

[54] PAGE PRINTER HAVING NO MEMORY FOR STORING IMAGE DATA FOR ENTIRE PAGE

[75] Inventor: Shigeru Ainai, Kawasaki, Japan

[73] Assignee: Fujitsu Limited, Kawasaki, Japan

[21] Appl. No.: 520,677

[22] Filed: Aug. 29, 1995

[30] Foreign Application Priority Data

Sep. 7, 1994 [JP] Japan ................................ 6-214056

[51] Int. Cl.$^6$ ............................................. H04N 1/21
[52] U.S. Cl. ........................ 358/296; 358/404; 395/115
[58] Field of Search ............................ 358/296, 404, 358/444; 347/251, 240; 395/115, 116; 364/900

[56] References Cited

U.S. PATENT DOCUMENTS

| | | | |
|---|---|---|---|
| 4,378,594 | 3/1983 | Kenyon | 395/497 |
| 4,463,443 | 7/1984 | Frankel | 395/390 |
| 5,220,645 | 6/1993 | Nakajima | 395/113 |
| 5,265,209 | 11/1993 | Kageyama et al. | 395/102 |
| 5,317,416 | 5/1994 | Tsuboi et al. | 358/444 |
| 5,444,827 | 8/1995 | Briggs et al. | 395/115 |
| 5,524,183 | 6/1996 | Kwon et al. | 395/114 |

FOREIGN PATENT DOCUMENTS 8-032814  2/1996  Japan ........................ H04N 1/41

OTHER PUBLICATIONS

Translation of German Official Action dated Jun. 10, 1996.

*Primary Examiner*—Peter S. Wong
*Assistant Examiner*—Gregory J. Toatley, Jr.
*Attorney, Agent, or Firm*—Armstrong, Westerman, Hattori, McLeland & Naughton

[57] ABSTRACT

A page printer has a printing unit for printing an image on a printing sheet based on bit-mapped data supplied from an external unit line by line. The page printer includes at least three buffers for storing bit-mapped data, a selecting system for selecting each of the three buffers as one of an input buffer, an output buffer and a working buffer, the input buffer being used to store bit-mapped data supplied from the external unit, the output buffer being used to supply bit-mapped data to the printing unit, the working buffer being used to process bit-mapped data, and a processing unit for processing the bit-mapped data using one of the three buffers selected as the working buffer.

3 Claims, 9 Drawing Sheets

PAGE PRINTER HAVING NO MEMORY FOR STORING IMAGE DATA FOR ENTIRE PAGE

BACKGROUND OF THE INVENTION

(1) Field of the Invention

The present invention generally relates to a page printer, and more particularly to a page printer which receives bit-mapped data from a host unit as line data in synchronism with feeding of a printing sheet and prints images based on the line data on the printing sheet.

(2) Description of the Related Art

Figure 1:
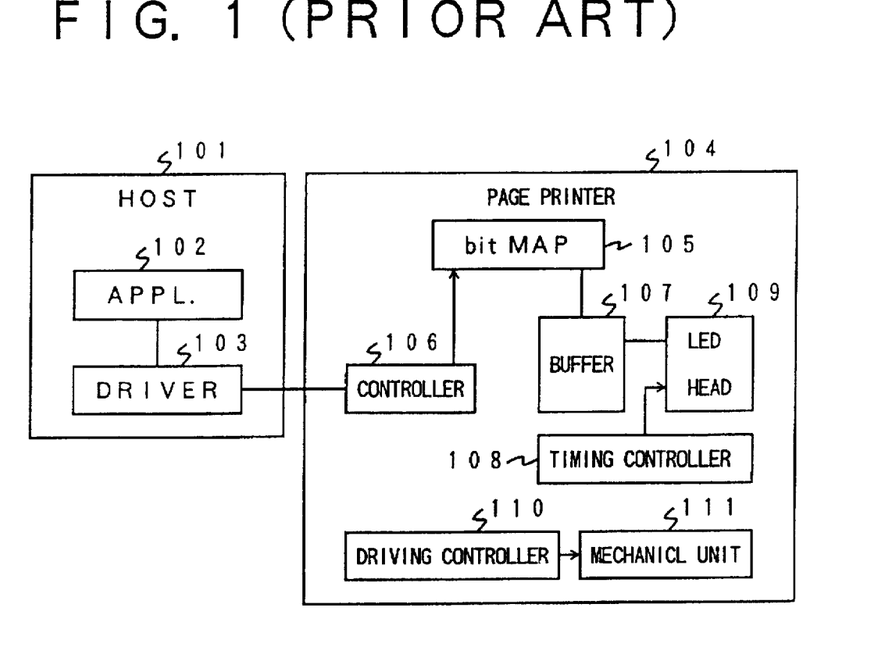
FIG. 1 is a block diagram illustrating a structure of a conventional page printer.

A conventional type of page printer has an LED (Light-Emitting Diode) array as a light source, which type of page printer is an electrophotographic type. As shown in FIG. 1, this type of page printer 104 receives code data generated by a driver 103 in accordance with operations of an application 102 in a host unit 101. The page printer 104 has a controller 106 including a character generator (CG) which converts the code data into image data (bit-mapped data), a bit map memory 105, a buffer 107, a timing controller 108 and an LED head 109. The buffer 107 stores the image data from the bit map memory 105 as line data corresponding to each line of a printed image. The LED head 109 emits light based on the line data from the buffer 107 at timings controlled by the timing controller 108 so that an exposure process is performed. As a result, an image corresponding to the image data spread on the bit map memory 105 is printed on a printing sheet.

The page printer 104 has also a mechanical unit 111 including motors and a driving controller 110 controlling the mechanical unit 111.

Figure 2:
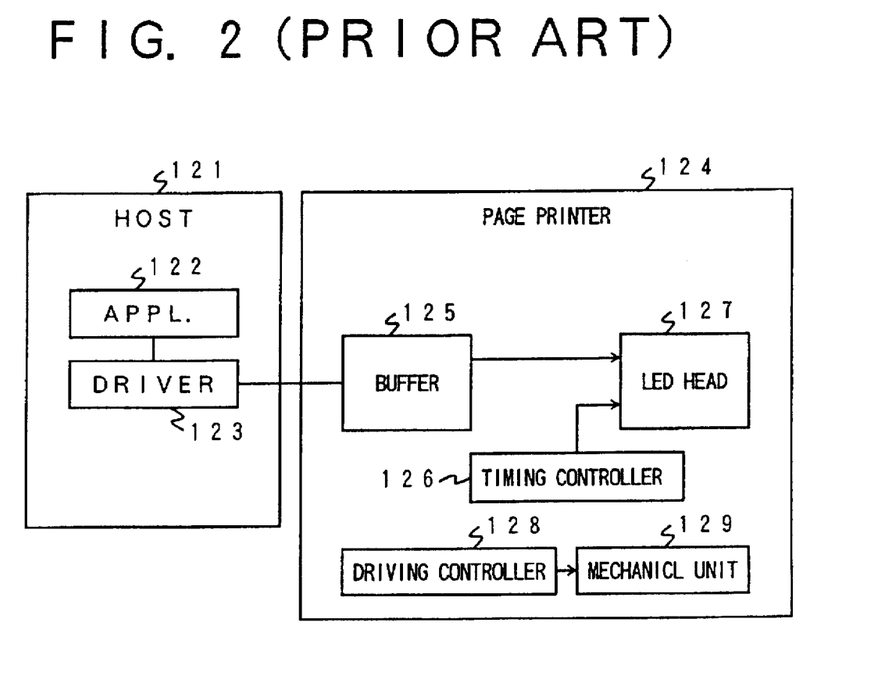
FIG. 2 is a block diagram illustrating another structure of a conventional page printer.

In order to provide an inexpensive page printer, a page printer from which the bit map memory is removed has been proposed. This page printer is formed, for example, as shown in FIG. 2. Referring to FIG. 2, in a host unit 121, a driver 123 converts code data into image data (bit-mapped data) based on an application 122. The image data is supplied to a page printer 124. The page printer 124 has a buffer 125, an LED head 127, a timing controller 126, a driving controller 128 and a mechanical unit 129 including motors. The image data from the host unit 121 is stored in the buffer 125 line by line. The LED head 127 emits light based on the image supplied from the buffer 125 at timings controlled by the timing controller 126, so that an exposure process is performed on an image retaining body such as a photosensitive body.

In the above page printer having no bit map memory, a visible image is formed on a printing sheet in accordance with an electrophotographic process. That is, an electrostatic latent image is formed on the image retaining body such as a photosensitive drum, and the electrostatic latent image is developed. The developed image (e.g., a toner image) is then transferred from the image retaining body to a printing sheet. The image formed on the printing sheet is fixed by a fixer. The image data corresponding to the visible image must be supplied to the LED head line by line in synchronism with feeding of the printing sheet without interruption.

However, the host unit must carry out processes other than processes for converting the code data into the bit-mapped data (the image data) and for supplying the bit-mapped data to the page printer. Thus, the conversion of the code data into the image data may be delayed in the host unit. If the supply of the image data for some lines to the page printer is interrupted, some white lines are formed in an image formed on the printing sheet. To prevent this, the host unit must preferentially carry out the process for supplying the image data to the page printer. As a result, in a case where the printing operation of the page printer is performed, the host unit does not have sufficient time for other processes.

SUMMARY OF THE INVENTION

Accordingly, a general object of the present invention is to provide a novel and useful page printer, having no bit map memory for storing image data for an entire page, in which the disadvantages of the aforementioned prior art are eliminated.

A specific object of the present invention is to provide a page printer, having no bit map memory for storing an entire page, which can carry out a printing operation even if image data is not supplied from a host unit line by line at accurate timings.

Another object of the present invention is to provide a page printer, having no bit map memory for storing an entire page, by which a host unit can have sufficient time for processes other than processes for converting code data into image data and for supplying the image data.

The above objects of the present invention are achieved by a page printer having a printing unit for printing an image on a printing sheet based on image data supplied from an external unit line by line, the page printer comprising: at least three buffers for storing image data; selecting means for selecting each of the three buffers as one of an input buffer, an output buffer and a working buffer, the input buffer being used to store image data supplied from the external unit, the output buffer being used to supply image data to the printing unit, the working buffer being used to process image data; and processing means for processing the image data using one of the three buffers selected as the working buffer.

According to the present invention, each of the three buffers is selected as one of the input buffer, the output buffer and the working buffer. That is, the three buffers can be used in the printing operation. Thus, even if image data is not supplied from a host unit line by line at accurate timings, the printing operation can be performed using the three buffers. The host unit can have sufficient time for processes other than processes for converting code data into image data and for supplying the image data.

In addition, since each of the three buffers can be used as the working buffer, a highly processed image can be printed using the working buffer.

BRIEF DESCRIPTION OF THE DRAWINGS

Other objects, features and advantages of the present invention will become apparent from the following detailed description when read in conjunction with the accompanying drawings, in which.

DESCRIPTION OF PREFERRED EMBODIMENTS

First, a description will be given, with reference to FIG. 3, of a principle of a page printer according to an embodiment of the present invention.

Figure 3:
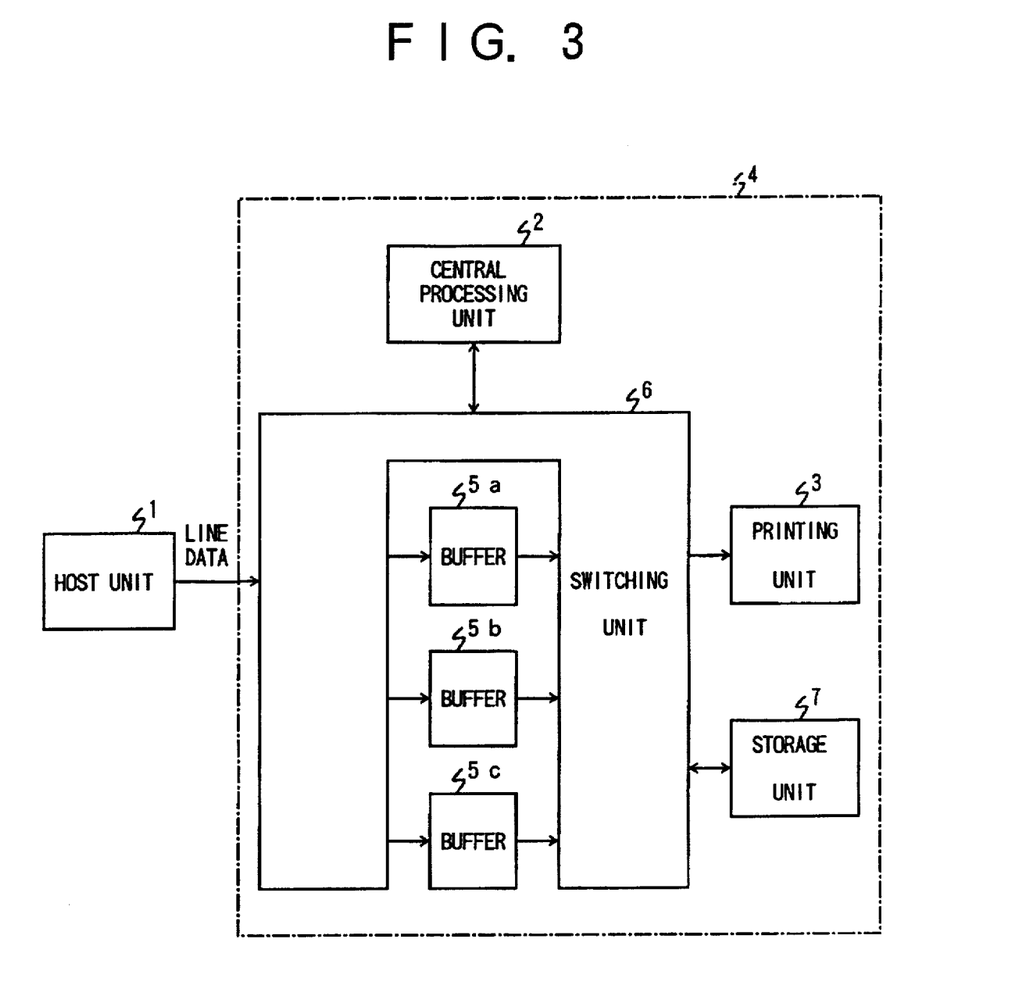
FIG. 3 is a block diagram illustrating the principle of a page printer according to an embodiment of the present invention.

Referring to FIG. 3, a page printer 4 is connected to a host unit 1. The host unit 1 supplies image data to the page printer 4 line by line (as line data). The page printer 4 has a central processing unit 2, a printing unit 3, a first buffer 5a, a second buffer 5b, a third buffer 5c, a switching unit 6 and a storage unit 7. Due to a switching operation of the switching unit 6 controlled by the central processing unit 2, data transmission paths connected to the first, second and third buffers 5a, 5b and 5c are switched so that each of the three buffers 5a, 5b and 5c is used as one of an input buffer, an output buffer and a working buffer. When a buffer is used as the input buffer, line data (image data) from the host unit 1 is set in the buffer. When a buffer is used as the output buffer, line data to be supplied to the printing unit 3 is set in the buffer. When a buffer is used as the working buffer, line data set in the buffer is processed (e.g., white pixels are inverted to black pixels and vice versa) by the central processing unit 2.

According to the page printer having the above structure, since the line data from the host unit 1 can be stored in a buffer (one of the three buffers 5a, 5b and 5c) selected as the input buffer, the host unit 1 can supply the line data to the page printer 4 even if the supplying of the line data is not accurately synchronized with a printing operation of the printing unit 3.

Each of the first, second and third buffers 5a, 5b and 5c has a capacity, for example, of one line of an image to be printed on a printing sheet having a maximum size.

When an amount of line data transmitted from the host unit 1 exceeds an amount of line data supplied to the printing unit 3 in synchronism with feeding of a printing sheet, the line data is stored in the storage unit 7. According to use of the storage unit 7, the host unit 1 may not need to wait to supply line data to the page printer 4.

A description will now be given of an embodiment of the present invention.

Figure 8:
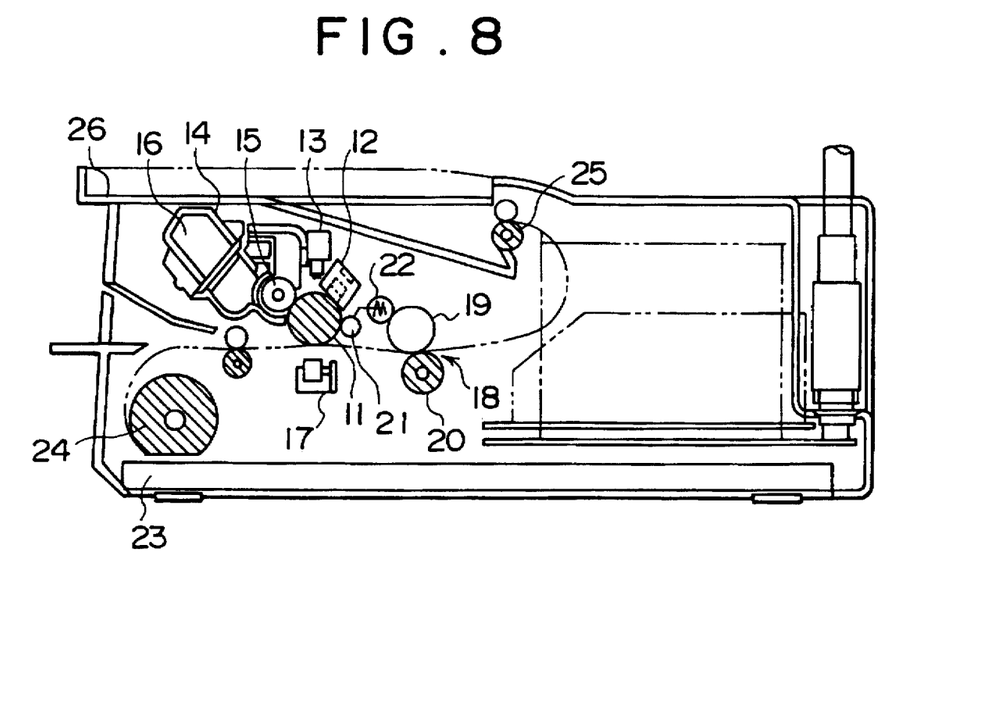
FIG. 8 is a diagram illustrating a mechanical structure of the page printer according to the embodiment of the present invention.

A mechanical structure of the page printer according to the present invention is formed, for example, as shown in FIG. 8. This page printer is an electrophotographic type page printer. Referring to FIG. 8, the page printer has a photosensitive drum 11, a pre-charger unit 12, an optical system 13, a developing unit 14, a transfer unit 17, a fixer 18 and a scattering roller 21.

The photosensitive drum 11 is formed of a drum made of aluminum and a mechanism separating type organic photosensitive material applied on the drum.

The pre-charger unit 12 is a non-contact type charger formed of a scorotron. The pre-charger unit 12 uniformly charges the surface of the photosensitive drum 11 (e.g., −650 volts).

The optical system 13 is used to expose the photosensitive drum 11 which has been uniformly charged so that an electrostatic latent image is formed on the photosensitive drum 11. The optical system 13 includes an LED array and a distributed index lens array both of which are integrated with each other. The optical system 13 exposes the photosensitive drum 11 in accordance with an image pattern so that the electrostatic latent image has a potential within a range of −50 volts to −100 volts.

The developing unit 14 stores developer including magnetic carrier such as iron powder carrier and magnetic toner such as magnetic polymerized toner. The developing unit 14 supplies the magnetic toner to the electrostatic latent image formed on the photosensitive drum 11 so that the electrostatic latent image becomes visible. The developing unit 14 has a developing roller 15 for supplying the developer to the photosensitive drum 11 and a developer housing space 16 for housing the developer. The developing roller 15 is formed of a magnet drum and a sleeve covering the magnet drum. The magnet drum is fixed and the sleeve is rotated. The developer in which the iron powder carrier and the magnetic polymerized toner are combined at a predetermined weight ratio is supplied from the developer housing space 16 to the developing roller 15. The density of the toner depends on an initial amount of carrier.

The transfer unit 17 is formed of a corona discharger. The transfer unit 17 electrostatically transfers a toner image formed on the photosensitive drum 11 to a printing sheet. A corona wire is connected to a power supply (e.g. +5 kilovolts—+10 kilovolts) so that a corona discharge occurs. Due to the corona discharge, a rear surface of the printing sheet is charged. As a result, the toner image is transferred from the photosensitive drum 11 to the printing sheet. The power supply has a constant current source.

The fixer 18 thermally fixes the toner image on the printing sheet. The fixer 18 has a heat roller 19 in which a halogen lamp is provided as a heat source and a pressure roller (a back-up roller) 20. The heat roller 19 and the pressure roller 20 press the toner with heat so that the toner image is fixed on the printing sheet.

The scattering roller 21 is provided with an AC voltage having a peak of 1400 volts and a frequency of 800 Hz. The scattering roller 21 scatters the residual toner on the surface of the photosensitive drum 11 so that residual toner can be easily collected by the developing unit 14.

The page printer further has a sheet cassette 23, a pick-up roller 24, an ejecting roller 25 and a stacker 26. The sheet cassette 23 houses printing sheets and is detachably set in a housing of the page printer. The sheet cassette 23 is provided at a bottom portion of the housing. The printing sheets are picked up off the sheet cassette 23 by the pick-up roller one by one. Each printing sheet output from the sheet cassette 23 is fed toward the photosensitive drum 11 and further fed to the ejecting roller 25 via the fixer 18. The ejecting roller 25 ejects printing sheets on which toner images have been formed to the stacker 26, so that the printing sheets are stacked on the stacker 26.

A description will now be given of an image forming process in the page printer having the above structure.

The pre-charger unit 12 uniformly charges the surface of the photosensitive drum 11 at −580 volts. The optical system 13 then exposes the surface of the photosensitive drum 11 based on the line data so that an electrostatic latent image is formed on the surface of the photosensitive drum 11. The electrostatic latent image has a potential within a range of −50 volts to −100 volts. The background of the electrostatic latent image has, for example, a potential of −580 volts.

A developing bias voltage (e.g., −300 volts) is supplied to the sleeve of the developing roller 15. In the developing unit 14, the magnetic polymerized toner and the carrier are agitated so that the magnetic polymerized toner is charged at a negative potential. As a result, the electrostatic latent image is developed by the magnetic polymerized toner so that a toner image corresponding to the electrostatic latent image is formed on the photosensitive drum 11.

A printing sheet is picked up off the sheet cassette 23 by the pick-up roller 24 and a position of a leading edge of the printing sheet is controlled by registration roller (not shown). The printing sheet is then fed toward the transfer unit 17. The toner image on the photosensitive drum 11 is transferred to the printing sheet by an electrostatic force between the toner image and the printing sheet charged by the transfer unit 17. The toner image transferred to the printing sheet is thermally fixed on the printing sheet by the fixer 18. After fixing the toner image, the printing sheet travels along a U-shaped feeding path and is ejected to the stacker 26 by the ejecting roller 25.

After transferring the toner image to the printing sheet, the residual toner on the photosensitive drum 11 is scattered by the scattering roller 21. When the residual toner on the rotated photosensitive drum 11 faces the developing unit 14, the developing roller 15 collects the residual toner while a developing process is being performed. The toner collected by the developing roller 15 is reused in the developing process.

Figure 9:
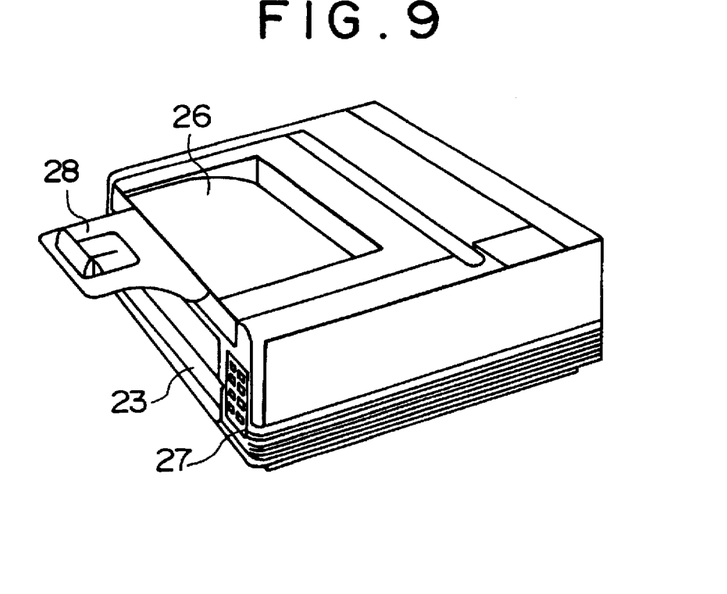
FIG. 9 is an exterior perspective view of the page printer.

The exterior of the page printer is shown in FIG. 9. As shown in FIG. 9, the sheet cassette 23 is set in the housing so as to be parallel to a horizontal direction, and an operation panel 27 is provided on a front surface of the housing. A sheet guide 28 is provided at an end of the stacker 26 to align leading edges of printing sheets stacked on the stacker 26.

A control system of the page printer having the structure described above is formed as shown in FIG. 4.

Figure 4:
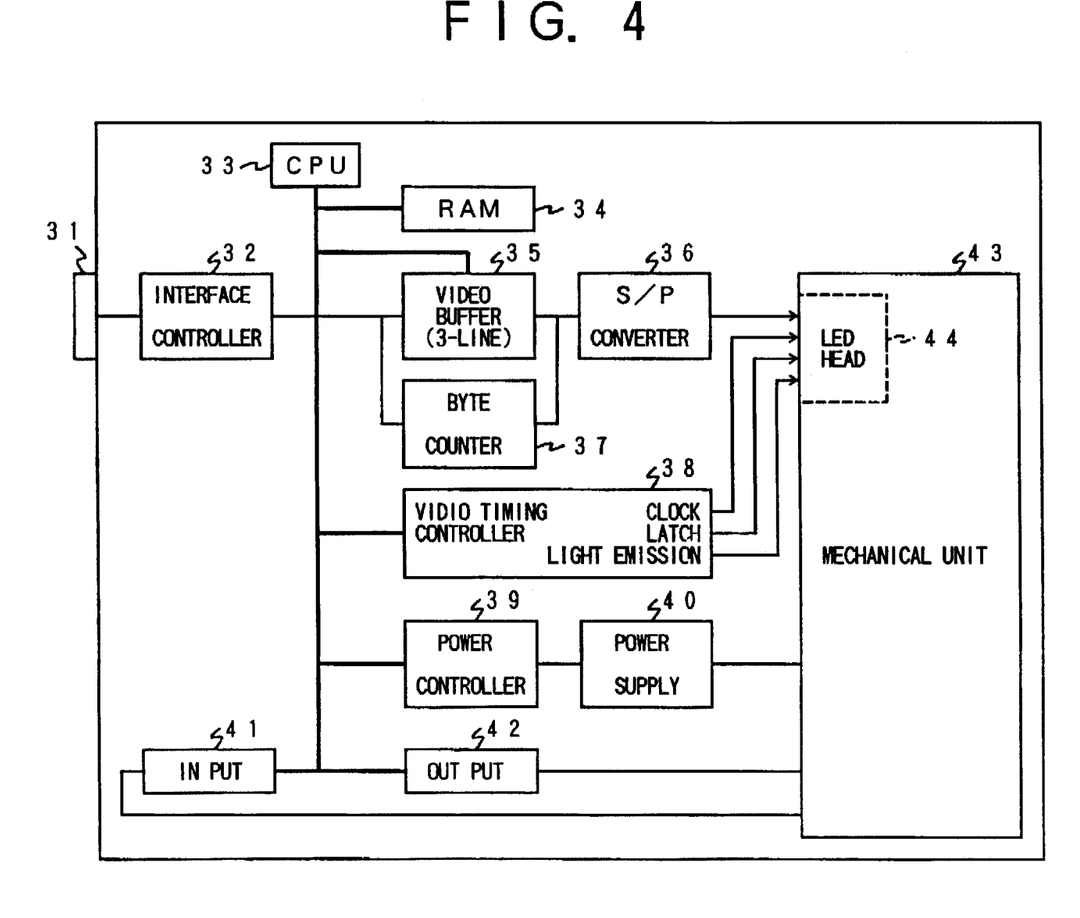
FIG. 4 is a block diagram illustrating a structure of the page printer according to the embodiment of the present invention.

Referring to FIG. 4, the control system has an interface 31 and an interface controller 32. The interface 31 which is controlled by the interface controller 32 receives image data supplied from the host unit line by line (the line data). The control system further has a central processing unit (CPU) 33, a random access memory (RAM) 34, a video buffer 35, a parallel-to-serial converter 36, a byte counter 37, a video timing controller 38, a power controller 39, a power supply 40, an input port 41, an output port 42 and a mechanical unit 43.

When an amount of line data (for example, corresponding to a size of A3) transmitted from the host unit exceeds an amount of line data to be printed on a printing sheet (for example, having a size of A4), an exceeding amount of line data is stored in the RAM 34. The video buffer 35 has three line buffers each of which has a capacity of one line in a printed image. The parallel-to-serial converter 36 converts parallel data from the video buffer 35 into serial data. The video timing controller 38 outputs a clock signal, a latch signal and a light emission control signal, all of which are used for printing control in the mechanical unit 43 having an LED head 44.

Data transmitted from the host unit to the page printer includes commands and bit-mapped data (the line data). The commands from the host unit are analyzed by the CPU 33 and data setting and various operations are performed in the page printer based on the analysis results. The bit-mapped data is supplied to the LED head 44 via the video buffer 35 and the parallel-to-serial converter 36 in synchronism with feeding of a printing sheet.

The bit-mapped data having a parallel form is converted into serial data by the parallel-to-serial converter 36 and the serial data is supplied to the LED head 44. In the LED head 44, bit data is shifted in synchronism with the clock signal from the video timing controller 38 and the shifted bit data is latched in a latch circuit in synchronism with the latch signal from the video timing controller 38. Further, light emission control of the LED head 44 is performed based on the light emission control signal from the video timing controller 38.

Figure 5:
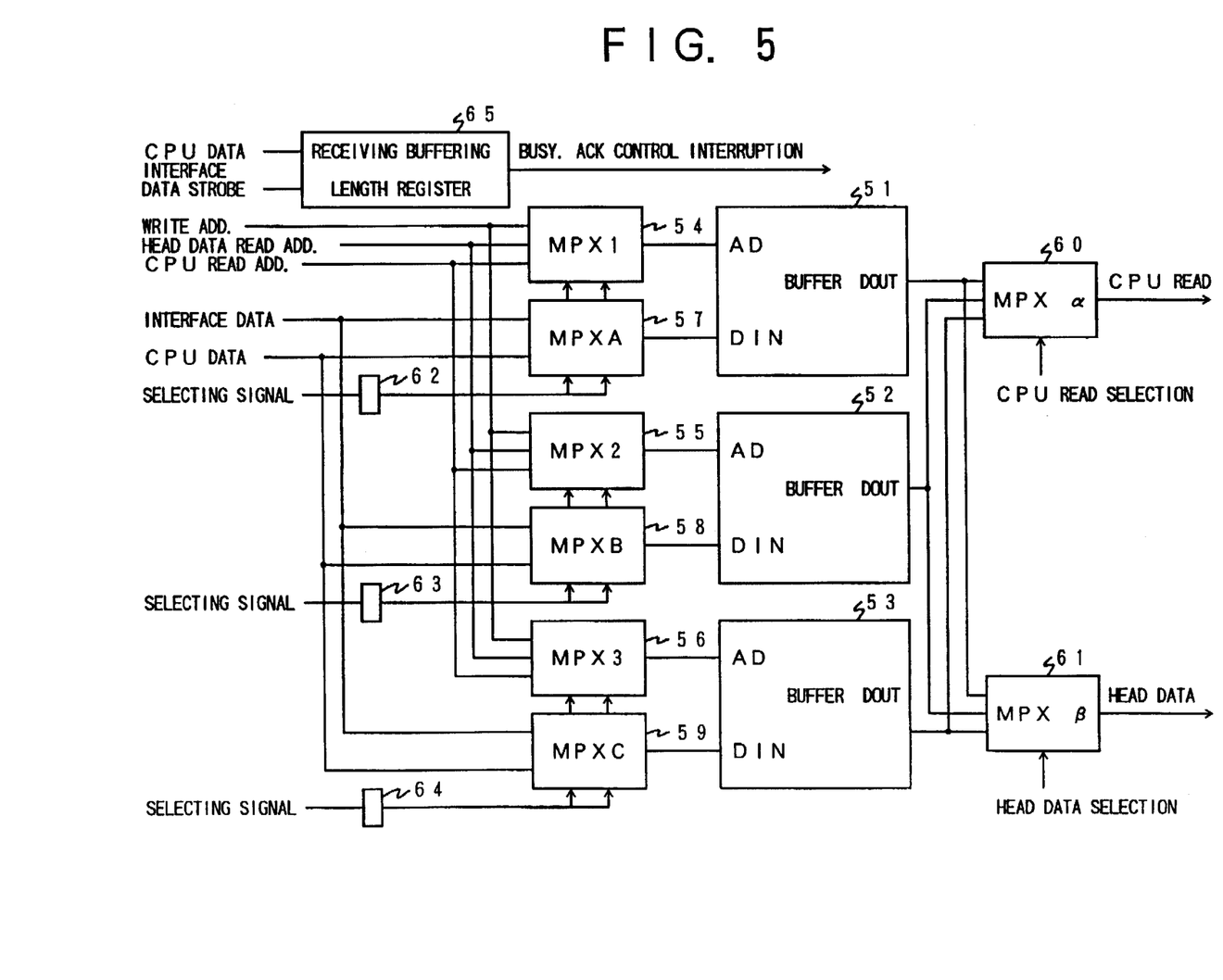
FIG. 5 is a block diagram illustrating a buffer unit provided in the page printer shown in FIG. 4.

The video buffer 35 is formed, for example, as shown in FIG. 5.

Referring to FIG. 5, the video buffer 35 has three line buffers 51, 52 and 53. Each of the line buffers 51, 52 and 53 has an address input terminal (AD), a data input terminal (DIN) and a data output terminal (DOUT). The video buffer 35 further has multiplexers 54, 55, 56, 57, 58, 59, 60 and 61, latches 62, 63 and 64, and a receiving buffering length register 65. The multiplexers 54, 55 and 56 are respectively connected to the address input terminals (AD) of the line buffers 51, 52 and 53. The multiplexers 57, 58 and 59 are respectively connected to the data input terminals (DIN) of the line buffers 51, 52 and 53. The data output terminals (DOUT) of all the line buffers 51, 52 and 53 are connected to both the multiplexers 60 and 61.

Each of the multiplexers 54, 55 and 56 selects addresses to be supplied to a corresponding one of the line buffers 51, 52 and 53 among from write addresses, head data read addresses and CPU read addresses. The write addresses are used to write data in a line buffer. The head data read addresses are used to read data to be supplied to the LED head 44. The CPU read addresses are used when the CPU 33 reads data from each line buffer.

Each of the multiplexers 57, 58 and 59 selects data to be input to a corresponding one of the line buffers 51, 52 and 53 from among interface data supplied via the interface 31 and the interface controller 32 and CPU data supplied from the CPU 33.

The multiplexer 60 selects data to be supplied to the CPU 33 from among data from the line buffers 51, 52 and 53 in a read operation of the CPU 33. The multiplexer 61 selects data to be supplied to the LED head 44 via the parallel-to-serial converter 36 from among data from the line buffers 51, 52 and 53 in a printing operation.

The CPU 33 sets selecting signals in the latches 62, 63 and 64 to respectively select the line buffers 51, 52 and 53. The selecting signals include signals based on which a corresponding one of the multiplexers 54, 55 and 56 selects one of the write addresses, the head data read addresses and the CPU read addresses, and a corresponding one of the multiplexers 57, 58 and 59 selects one of the interface data and the CPU data.

A description will now be given, with reference to FIGS. 6A, 6B and 7, of an operation of the page printer.

Figure 6A:
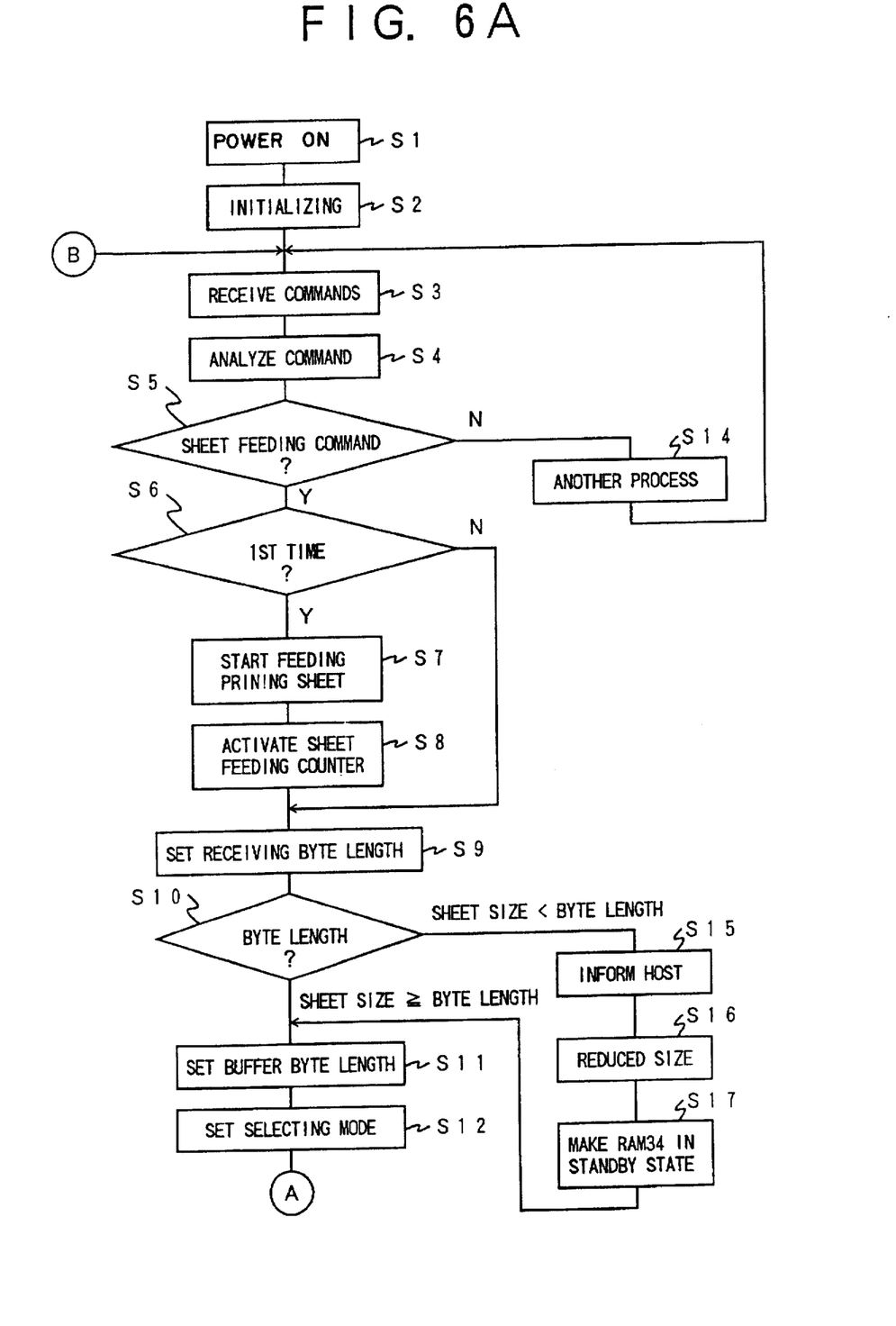
FIGS. 6A and 6B are flowcharts illustrating an operation of the page printer shown in FIG. 4.

Referring to FIG. 6 which is a flowchart illustrating the operation of the page printer, when a power to the page printer is turned on (S1), the CPU 33 carries out an initializing process (S2). After this, the host outputs a strobe signal (*STB) (t1 shown in FIG. 7) and supplies data to the page printer. The CPU 33 processes the data supplied from the host unit via the interface 31 and the interface controller 32. When the data supplied from the host unit includes commands (S3), the CPU 33 activates a busy signal (BUSY shown in FIG. 7). In a state where the busy signal is activated, the CPU 33 analyzes the commands (S4). When the CPU 33 detects that a sheet feeding command supplied to feed printing sheets is included in the received commands (S5), it is determined whether this is the first receiving of the sheet feeding command (S6). If this is the first receiving of the sheet feeding command, a printing sheet starts to be fed from the sheet cassette 23 (S7, t2 shown in FIG. 7) and a sheet feed counter is activated (S8). A count value of the sheet feed counter corresponds to a distance the printing sheet is fed.

The CPU reads data length information (the number of bytes of printing data) included in the received commands (S9). It is determined whether or the size of the printing sheet is equal to or greater than a value corresponding to the data length of the printing data (S10). When the size of the printing sheet is equal to or greater than the value corresponding to the data length of the printing data, the data length information of the line buffer is set in a register (S11). After this, the CPU 33 selects each of the three line buffers 51, 52 and 53 as one of an input buffer, an output buffer and a working buffer (S12).

Figure 10:
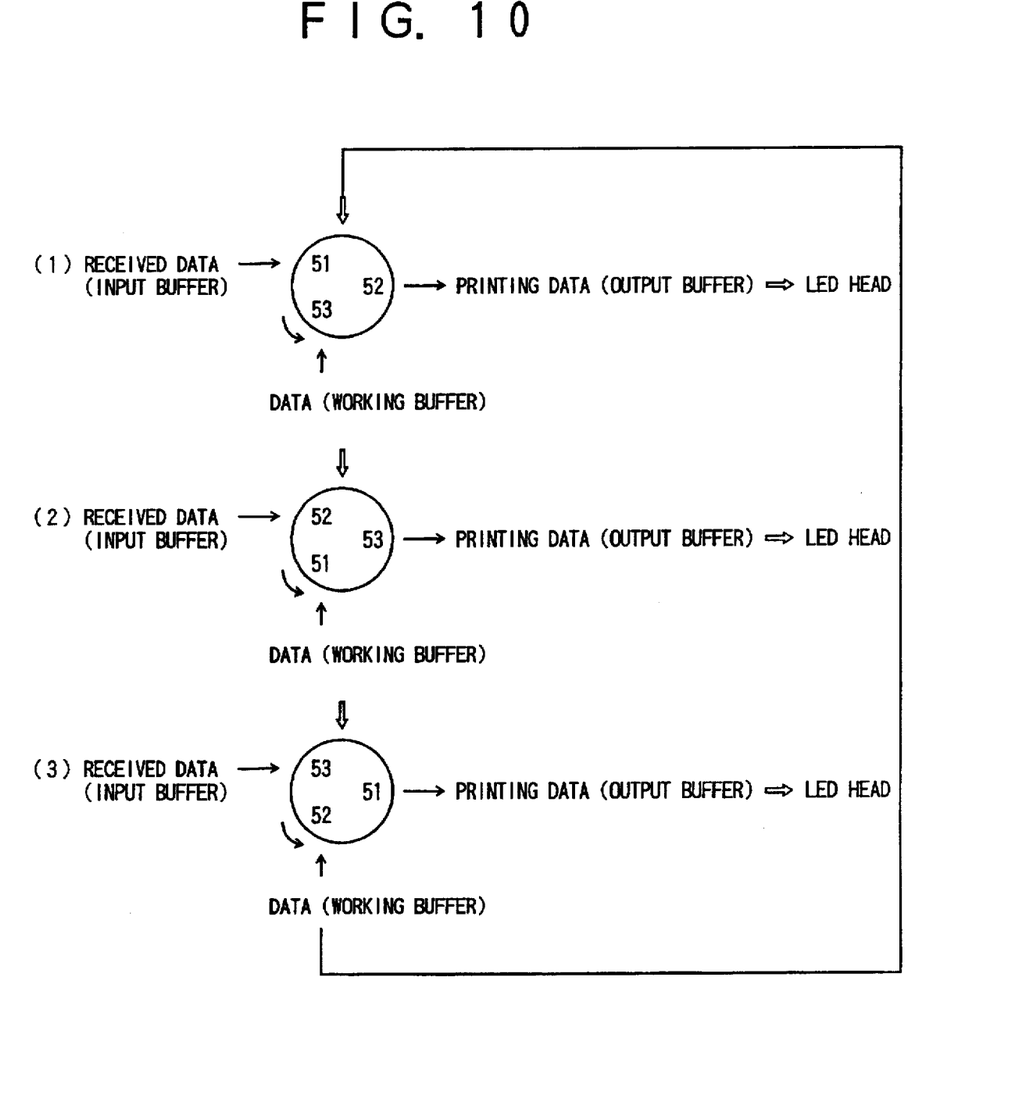
FIG. 10 is a diagram illustrating a rule in accordance with which each of the three buffers is selected as one of an input buffer, an output buffer, and a working buffer.

Each of the three line buffers 51, 52 and 53 is selected as one of the input buffer, the output buffer and the working buffer in accordance with a rule shown in FIG. 10. Referring to FIG. 10, in a first selecting mode (1), the line buffer 51 is selected as the input buffer so that received line data is set in the line buffer 51. The line buffer 52 is selected as the output buffer so that line data set in the line buffer 52 is supplied as the printing data to the LED head 44. The line buffer 53 is selected as the working buffer so that data to be processed is set in the line buffer 53. In a second selecting mode (2), the line buffers 51, 52 and 53 are respectively selected as the working buffer, the input buffer and the output buffer. In a third selecting mode (3), the line buffers 51, 52 and 53 are respectively selected as the output buffer, the working buffer and the input buffer.

Returning to FIG. 6A, the CPU 33 sets the system, for example, in the first selecting mode (1) in step S12. As a result, the CPU 33 outputs a selecting signal to select the line buffer 51 as the input buffer. That is, the selecting signal is set in the latch 62, so that the multiplexer 54 is set in a state where the write addresses from the CPU 33 are selected. Further, the multiplexer 57 is set in a state where the interface data supplied through the interface 31 and the interface controller 32 is selected. The other multiplexers 55 and 56 are set in a state where addresses other than the write addresses are selected.

Figure 7:
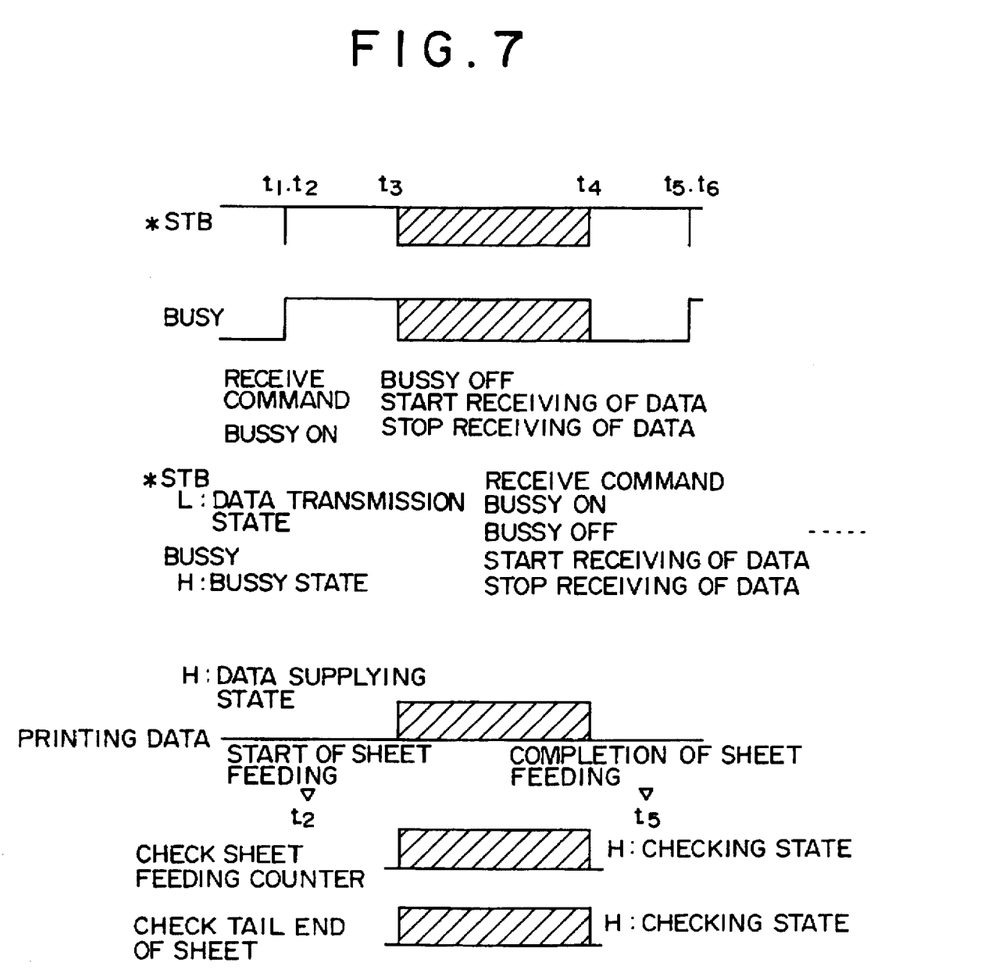
FIG. 7 is a timing chart illustrating signals in the printer shown in FIG. 4.

After the multiplexers are completely set in the respective states, the CPU 33 makes the busy signal inactive (t3 shown in FIG. 7). The inactive busy signal indicates that the page printer has been set in a state where bit-mapped data (line data) can be received.

Figure 6B:
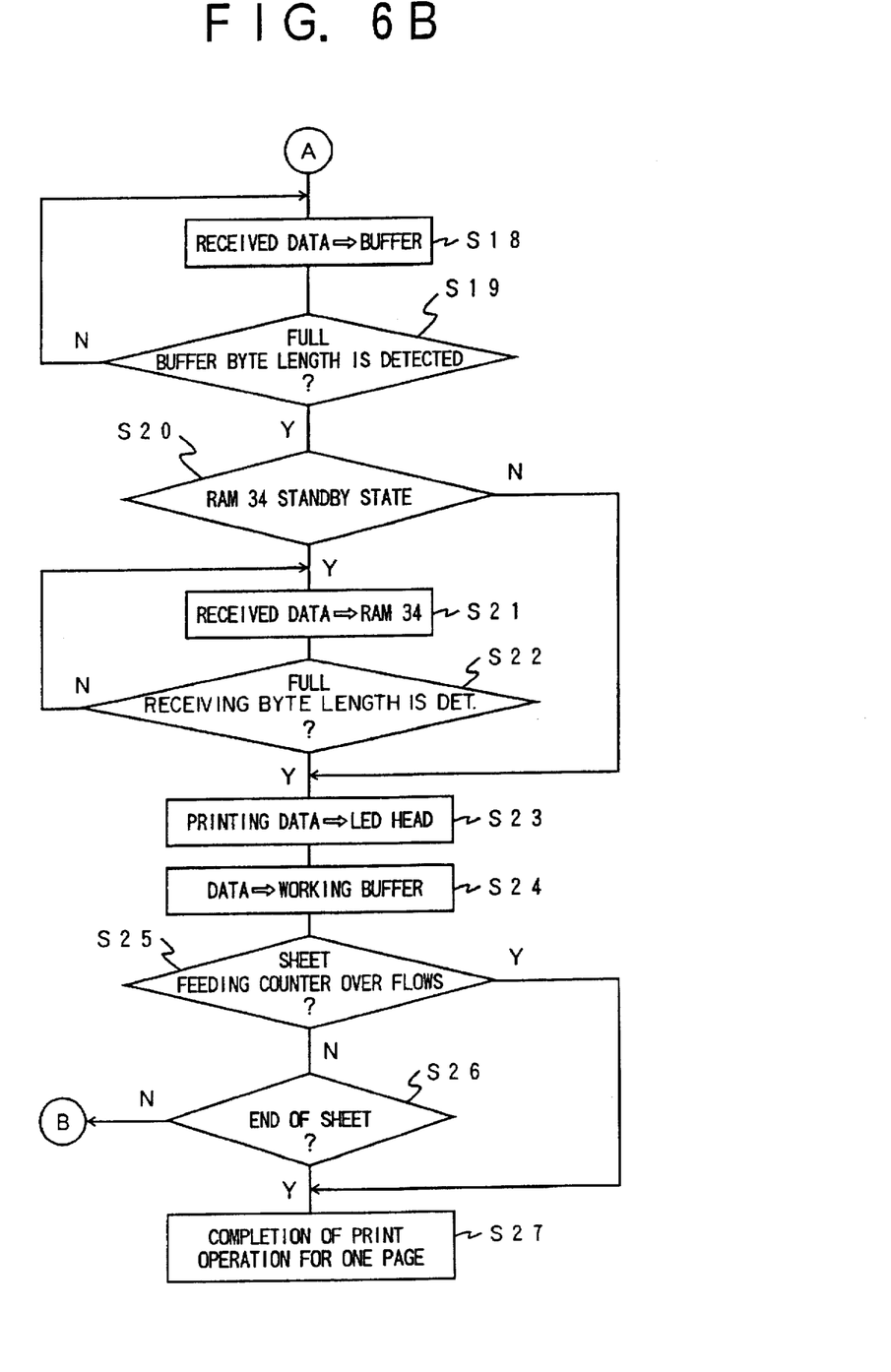

After this, the process proceeds from step S12 to step S18 shown in FIG. 6B. The host unit transmits line data to the page printer. The line data is supplied to the video buffer 35 via the interface 31 and the interface controller 32 (S18). The byte counter 37 counts a number of bytes of the line data supplied to the video buffer 35. The line data supplied to the video buffer 35 is successively stored in the line buffer 51 which has been selected as the input buffer. While the line data is being stored in the line buffer 51, the CPU 33 monitors the count value of the byte counter 37 (S19). When the count value reaches a value corresponding to the data length information set in the register in step S11, the data receiving operation is stopped. After this, the CPU 33 determines whether or not the RAM 34 has been in a standby state which will be described later (S20). In this case, the RAM 34 is not in the standby state, so that the process proceeds from step S20 to step S23.

The CPU 33 then changes the first selecting mode (1) to the third selecting mode (3) so that the line buffer 51 in which the line data has been set is selected as the output buffer. That is, the CPU 33 changes the selecting signal set in the latch 62 so that the multiplexer 54 selects the head data read addresses. Further, the CPU 33 controls the multiplexer 61 so that the line buffer 51 is selected. As a result, the line buffer 51 is selected as the output buffer. A read operation for reading data from the line buffer 51 is performed, so that data is supplied from the line buffer 51 to the LED head 44 in synchronism with the feeding of a printing sheet (S23). Thus, a line image corresponding to the line data supplied to the LED head 44 is printed on the printing sheet.

After this, in a case where the CPU 33 processes data, the data to be processed is set in the line buffer 52 which has been selected as the working buffer in the second selecting mode (3) (S24).

After the line data starts to be supplied from the line buffer 51 to the LED head 44, the CPU 33 determines whether or not the sheet feed counter has overflown (S25). When the sheet feed counter has not overflown yet, the CPU further determines, based on a count value of the sheet feed counter activated in step S8, whether the printing sheet has been fed for a predetermined distance (S26). Further, it is checked whether the tail end of the printing sheet is detected by a sensor provided at a predetermined position. If the printing sheet has not yet fed for the predetermined distance and the tail end of the printing sheet is not detected, the process within a range of the steps S3 to S26 is repeated.

In the repeated process, if the line data is being supplied from the line buffer 51 to the LED head 44 (the printing operation is being performed), the CPU 33 sets the selecting signal in the latch 64, so that the multiplexer 56 is set in a state where the write addresses from the CPU 33 are selected. Further, the multiplexer 59 is set in a state where the interface data is selected. That is, the line buffer 53 is selected as the input buffer in the third selecting mode (3). Thus, while the line data is being supplied from the line buffer 51 to the LED head 44, the next line data transmitted from the host unit is stored in the line buffer 53. When the next line data is completely stored in the line buffer 53, the third selecting mode (3) is changed to the second selecting mode (2) so that the line buffer 53 is selected as the output buffer in the same manner as in the case of the line buffer 51. As a result, the next line data is supplied from the line buffer 53 to the LED head 44.

The repeated process proceeds from the step S6 to the step S9 without executing the steps S7 and S8.

The process within a range of the steps S3–S26 is repeated until the CPU 33 determines that the printing sheet has been fed for the predetermined distance (S26) and the tail end of the printing sheet is detected by the detector. When the printing sheet has been fed for the predetermined distance and the tail end of the printing sheet is detected, the printing operation for one page is completed (t5 shown in FIG. 7). After this, if the host unit has image data for the next page, the process for the next page starts (t6 shown in FIG. 7) and is executed in the same manner as in the above case.

In the above process, if it is determined in step S5 that the sheet feeding command is not included in the received commands, another process is executed in step S14.

If it is determined in step S10 that the size of the printing sheet is less than the value corresponding to the data length of the printing data, the process proceeds from step S10 to step S15. In step S15, the CPU 33 informs the host that the data length of the printing data exceeds the size of the printing sheet. It is then requested in step S16 that a printed size should be reduced (a reduced size printing). After this, the RAM 34 is made to be in the standby state. In this case, while the data is being received, it is further determined in step S20 whether the RAM 34 is in the standby state. Since the RAM 34 has been already in the standby state, the data further supplied from the host is stored in the RAM 34 (S21). If it is then determined that the count value reaches a value corresponding to the data length information set in the receiving buffering length register 65 in step S9, the process proceeds to step S23. As a result, after the data set in the line buffer selected as the output buffer is supplied to the LED head 44, the data stored in the RAM 34 is then supplied as the printing data to the LED head 44.

Further, the process in step S24 is performed as follows.

In a case where the CPU 33 processes data while the printing operation as described above is being executed, the CPU 33 determines which line buffer is not used. For example, in a case where the second selecting mode is set in the system, the line buffer 51 is not used as the input buffer and the output buffer. The CPU 33 sets a selecting signal in the latch 62 to select the line buffer 51 as the working buffer. Due to the selecting signal, the multiplexer 54 is set in a state where the write addresses are selected. Further, the multiplexer 57 is set in a state where CPU data supplied from the CPU 33 is selected. That is, the line buffer 51 is selected as the working buffer.

The line data transmitted from the host unit as data to be processed is stored in the line buffer 51 which has been selected as the working buffer. In this state, the CPU 33 processes the data set in the line buffer 51 (e.g., white pixels are changed to black pixels and vice versa). After this, the multiplexer 61 is controlled so as to select the line buffer 51. As a result, the processed data is supplied from the line buffer 51 to the LED head 44. Thus, an image corresponding to the processed data is printed on the printing sheet.

The present invention is not limited to the aforementioned embodiments, and other variations and modifications may be made without departing from the scope of the claimed invention.

What is claimed is:

1. A page printer having a printing unit for printing an image on a printing sheet based on bit-mapped data supplied from an external unit line by line, said page printer comprising:

a first buffer for storing bit-mapped data;

a second buffer for storing bit-mapped data;

a third buffer for storing bit-mapped data;

control means for cyclically switching between a first selecting mode, a second selecting mode and a third selecting mode, wherein the first selecting mode uses said first buffer, said second buffer and said third buffer to correspond to an input buffer, an output buffer and a working buffer, respectively, the second selecting mode uses said first buffer, said second buffer and said third buffer to correspond to the working buffer, the input buffer and the output buffer, respectively, and the third selecting mode uses said first buffer, said second buffer and said third buffer to correspond to the output buffer, the working buffer and the input buffer, respectively, the input buffer being a buffer to store bit-mapped data supplied from said external unit, the output buffer being a buffer to supply bit-mapped data to said printing unit, the working buffer being a buffer to process bit-mapped data; and processing means for processing the bit-mapped data stored in one of said first, second and third buffers, used as the working buffer.

2. The page printer as claimed in claim 1, wherein each of said first, second and third buffers has a capacity corresponding to an amount of data for one line of an image to be printed on a printing sheet having a maximum size.

3. The page printer as claimed in claim 1 further comprising:

storage means for storing a part of bit-mapped data supplied from said external unit when an amount of the bit-mapped data supplied from said external unit exceeds an amount of bit-mapped data which has been decided as an amount of bit-mapped data to be used to print an image by said printing unit.

* * * * *